Nov. 30, 1926.

C. W. COLE

TIRE PUMP

Filed August 12, 1926

1,608,723

Inventor
Carry W. Cole
By Adam E. Fisher
Attorney

Patented Nov. 30, 1926.

1,608,723

UNITED STATES PATENT OFFICE.

CAREY W. COLE, OF CENTER, MISSOURI.

TIRE PUMP.

Application filed August 12, 1926. Serial No. 128,730.

My invention has reference to air pumps, and more particularly to those designed for inflating automobile tires.

The object of the invention is to provide a portable and easily operated pump which shall be capable of being folded into a small space.

With the above and other objects in view, my invention consists of the combination and arrangement of parts hereinafter described and claimed, it being understood that, within the scope of what is claimed, changes in the precise embodiment of the invention shown, may be made, without departing from the spirit of the invention.

In the drawing—

Figure 1:
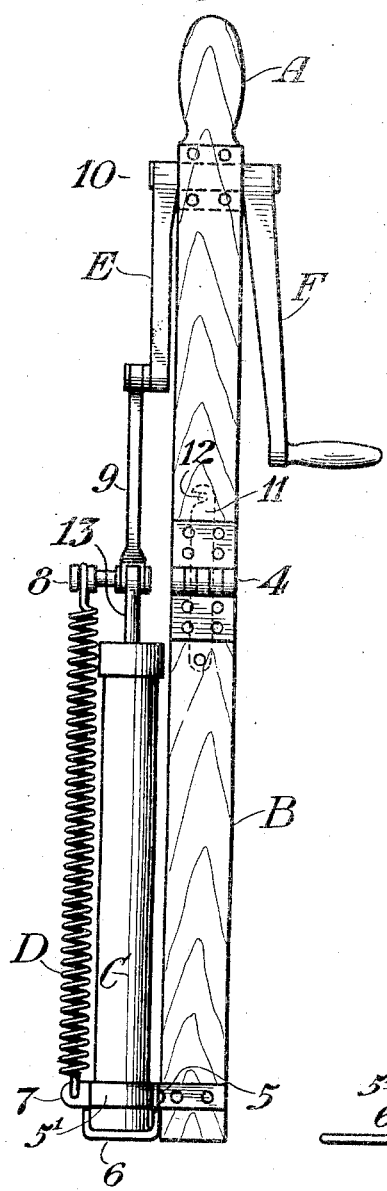
Figure 1 is a front elevation of my invention.
Figure 2:
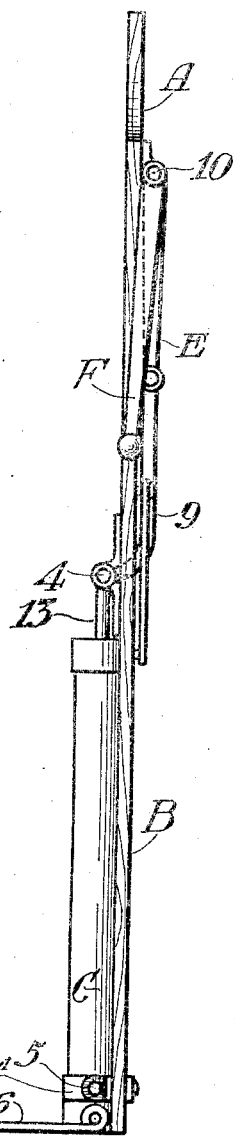
Figure 2 is a side view of the same.
Figure 3:
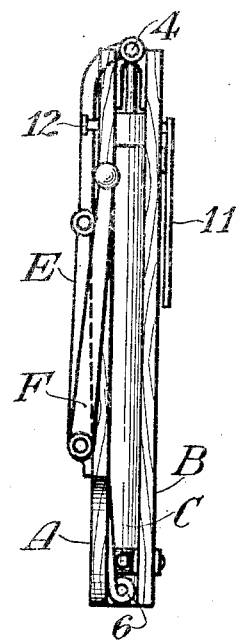
Figure 3 is a view of my invention when in the folded or collapsed state.

Referring now more particularly to the drawings, A refers to the upper half of a standard, in the preferred form constructed of wood, but metal may be used at the option of the person constructing the device. B refers to the lower half of the said standard, being connected to the piece A by the hinge 4. C refers to an air cylinder, such as an ordinary tire inflation pump having provided thereon the folding foot rest 6, and oscillatably mounted on the piece B as at 5. D refers to a spring having its lower end affixed to the ear 7 and made a part of the clamp 5' as shown, the upper end of the said spring D being affixed to the pin 8 mounted on the pump rod 13. Also pivotally mounted on the pin 8 is the curved link 9 pivotally connected to the crank E positioned on one end of the axle 10 which is rotatably mounted on the upper end of the piece A. Positioned on the other end of the axle 10 is the operating crank F.

The latch 11 is pivotally mounted on the piece B, and engages with the pin 12 so as to hold the device in its opened position but is readily disengaged therefrom so as to permit the piece A, carrying the cranks E and F, to fold about the hinge 4 and the pin 8, said hinge 4 and pin 8 being disposed so as to lie in the same axial plane when in the position as shown.

In constructing the device, the length of the crank E is made equal to the length of the link 9, whereby the action of the spring D is secured at its most favorable aspect.

I claim:

In a folding air pump, the combination of a folding standard comprising an upper part hinged to a lower part thereof, an air cylinder positioned to one side of said lower part of said standard, a pump rod slidably positioned in said cylinder, a spring engaging said pump rod and said lower part of said standard, so as to normally hold said pump rod in the lower position of its stroke, a link pivotally mounted on said pump rod, axially in line with said hinge, a crank rotatably mounted on said upper part of said standard, said link being pivotally connected thereto and means for causing the rotation of said crank.

In testimony whereof I affix my signature.

CAREY W. COLE.